United States Patent [19]

Vigneron et al.

[11] Patent Number: 4,718,701
[45] Date of Patent: Jan. 12, 1988

[54] PIPE COUPLING APPARATUS WITH SPLIT RING AND CLAMPS

[75] Inventors: Pierre Vigneron; Jean-Pierre Vitel, both of Pont A Mousson, France

[73] Assignee: Pont-A-Mousson S.A., Nancy, France

[21] Appl. No.: 23,500

[22] Filed: Mar. 9, 1987

[30] Foreign Application Priority Data

Mar. 7, 1986 [FR] France ................. 86 03254

[51] Int. Cl.⁴ .......................................... F16L 55/00
[52] U.S. Cl. ........................... 285/91; 285/297; 285/321
[58] Field of Search ............... 285/91, 374, 321, 294, 285/297

[56] References Cited

U.S. PATENT DOCUMENTS

| 4,428,604 | 1/1984 | Conner ............... 285/374 X |
| 4,456,288 | 6/1984 | Conner ............... 285/374 X |
| 4,643,466 | 2/1987 | Conner et al. ......... 285/374 |

FOREIGN PATENT DOCUMENTS

| 0011187 | 5/1980 | European Pat. Off. ..... 285/374 |
| 2450988 | 11/1980 | France ................ 285/374 |

Primary Examiner—Dave W. Arola
Attorney, Agent, or Firm—Sughrue, Mion, Zinn, Macpeak and Seas

[57] ABSTRACT

An apparatus for locking the male spigot end 2 of one pipe within the female bell housing 1 of another pipe includes a split ring 6 inserted under a radial flange 12 of the housing and a pair of clamps 16 having lugs 19 engaging mating notches 18 in the ends of the ring. The clamps are spread apart by a jack to expand the ring, whereafter they are circumferentially locked against the housing by driven wedging keys 20.

5 Claims, 9 Drawing Figures

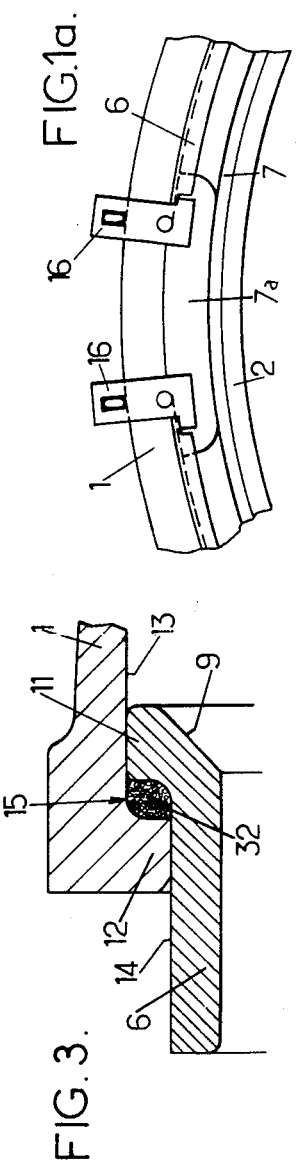
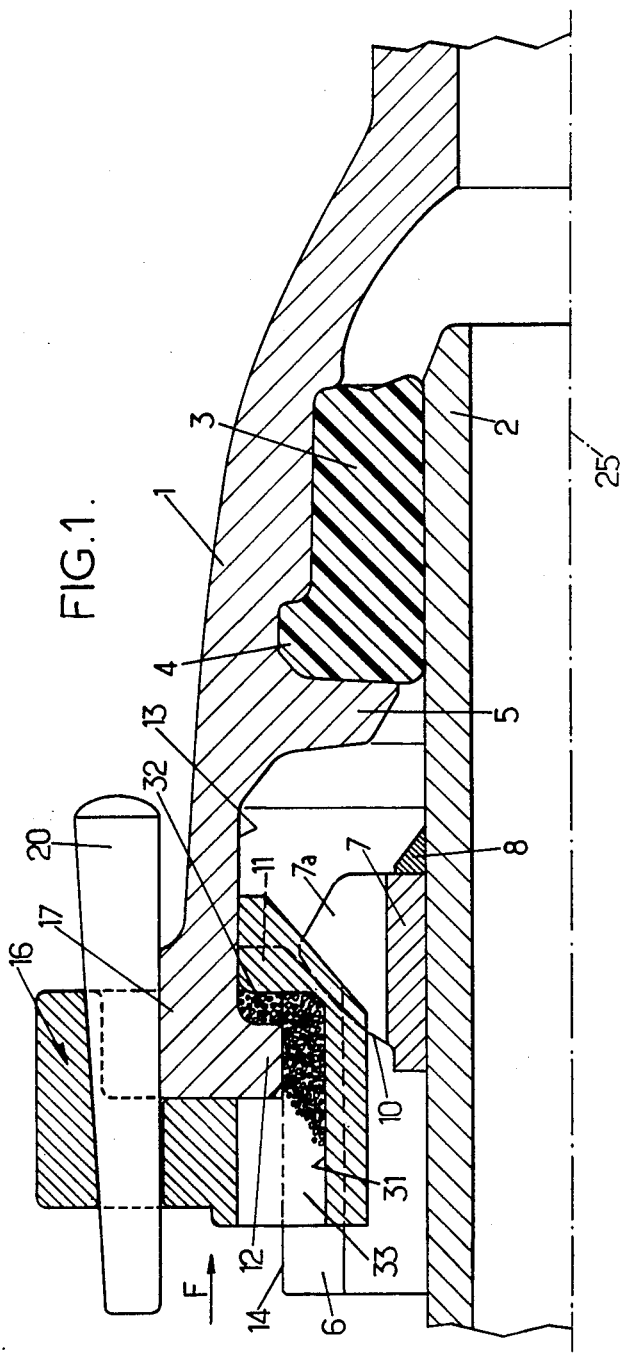

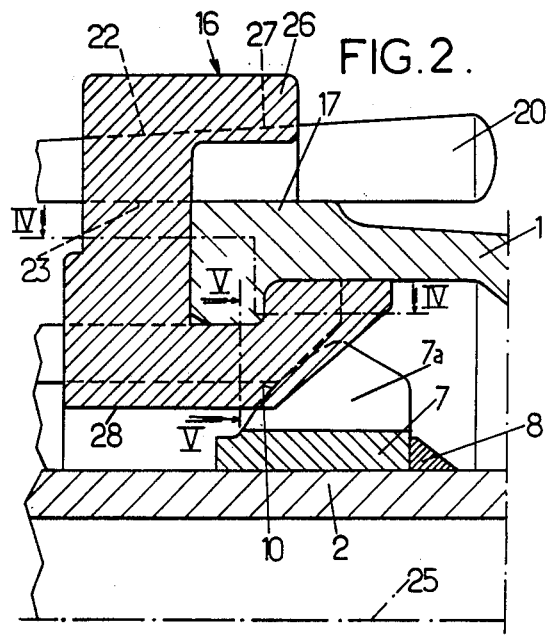
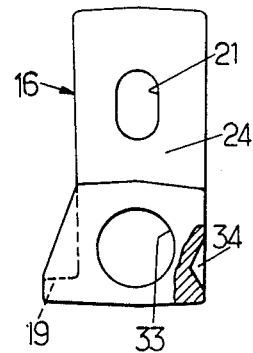
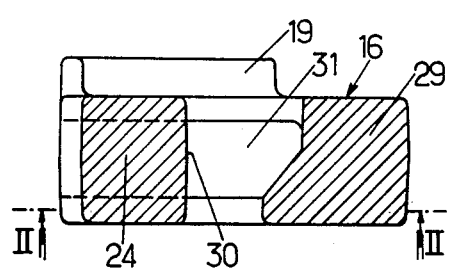
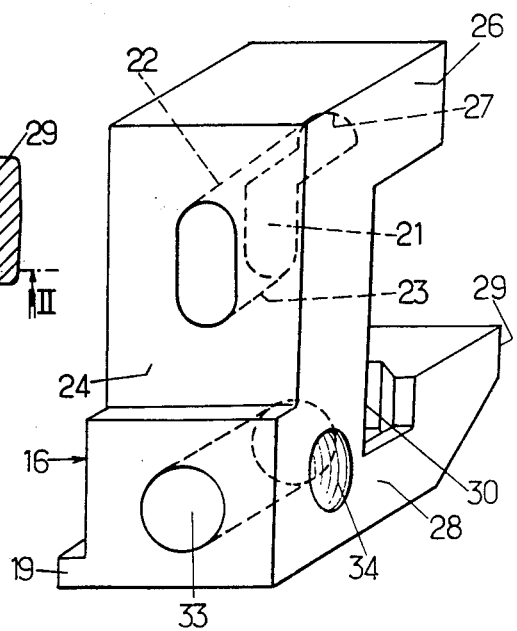

PIPE COUPLING APPARATUS WITH SPLIT RING AND CLAMPS

BACKGROUND OF THE INVENTION

This invention relates to an apparatus for coupling pipe ends together, with the male spigot end of one pipe being inserted into the female bell housing end of another pipe. It particularly concerns a split ring for engaging under a lip or flange of the bell housing, and clamps for engaging the bell housing and locking the ring in an expanded state.

It is known to assemble a distancing device or spacer comprised of a screw with threaded shafts having reversed pitches, the distal ends of which are supported on support plates provided at the opposite ends of a bearing ring and whose proximal ends cooperate with the internal screw threads having reversed pitch of a central adjustment screw, i.e. similar to a turnbuckle arrangement.

This type of distancing device is generally satisfactory, but the force which the separation screw can generate is relatively limited, and the screw is under constant stress. Consequently, it is not assured that the entire periphery of the bearing ring is completely and firmly applied against the internal surface of the bell housing.

SUMMARY OF THE INVENTION

The object of this invention is thus to improve this type of coupling device and to produce a considerably greater distancing force without requiring the permanent action of a jack.

For this purpose, a coupling device of the type defined above, according to the invention, comprises two clamps placed in the space between the ends of the split bearing ring, each clamp having a stop lug for mating with a notch in the end of the ring, and each clamp being fastened to the bell housing fitting by a locking device in the form of a wedging key.

With this arrangement the external periphery of the bearing ring can be tightened to a much greater degree than before against the internal surface of the fitting, because a hydraulic jack can be used, placed between the opposing sides of the two clamps, to separate the latter as much as possible and thus to produce a maximum expansion of the bearing ring. When this operation is completed, the locking means will be put into place, locking each clamp on the fitting, from which the hydraulic jack will then be removed.

As such, the established goal is achieved, since one can thus obtain a greater degree of distancing force than with a screw, and the hydraulic jack utilized no longer has to be kept in place on a permanent basis; it is used only in a transitory manner when the joint is being assembled.

To prevent the fitting from moving away axially during the operation in which the key is wedged, each clamp comprises a body extending perpendicularly to a base intended to come essentially to the level of the bearing ring, with an opening for the key passing through this body and a groove placed between this body and an edge of the base to accommodate the flange of the fitting.

It is understood that this edge makes it possible for each clamp to be axially held in place when the key is being wedged, because, in this case, this edge will bear against the rear radial wall of the fitting.

Moreover, so that the keys are guided properly during the wedging operation, each clamp has an overhang parallel to its base and defining a guide channel for the key, with the bottom of this channel preferably being inclined and constituting an extension of the upper wall of the opening.

In addition to the advantages mentioned above, the invention allows the convenient placement of the mass of balls, metal pellets or similar material inserted between the internal cylindrical surface of the fitting and the external cylindrical surface of the bearing ring; to do so, a passage is provided through the body of each of the clamps. For this purpose, on the sides of the clamps intended to face each other, the width of the groove is such that it is totally blocked by the flange of the fitting, while on the other sides of the clamps the outlet width of the groove is greater than the transverse section of the flange so that a connection is established between a trough defined at the bottom of the clamp, under the flange, and the annular space for the incompressible mass. The trough may be fed with granular material via the passage through the body of the clamp.

BRIEF DESCRIPTION OF THE DRAWINGS

FIG. 1 is a half axial cross section of a connecting device according to the invention, through the axial plane of the left clamp in FIG. 8;

FIG. 1a is a view following arrow F in FIG. 1;

FIG. 2 is a partial cross section analogous to that in FIG. 1, taken through line II—II in FIG. 4;

FIG. 3 is a partial axial cross section through line III—III in FIG. 8;

FIG. 4 is a horizontal cross section of a clamp through line IV—IV in FIG. 2;

FIG. 5 is a transverse section of a clamp through line V—V in FIG. 2.

FIG. 6 is an elevation of the rear of a clamp in partial cross section;

FIG. 7 is a perspective view of the rear three quarters of a clamp; and

DETAILED DESCRIPTION OF THE PREFERRED EMBODIMENT

Figure 8:
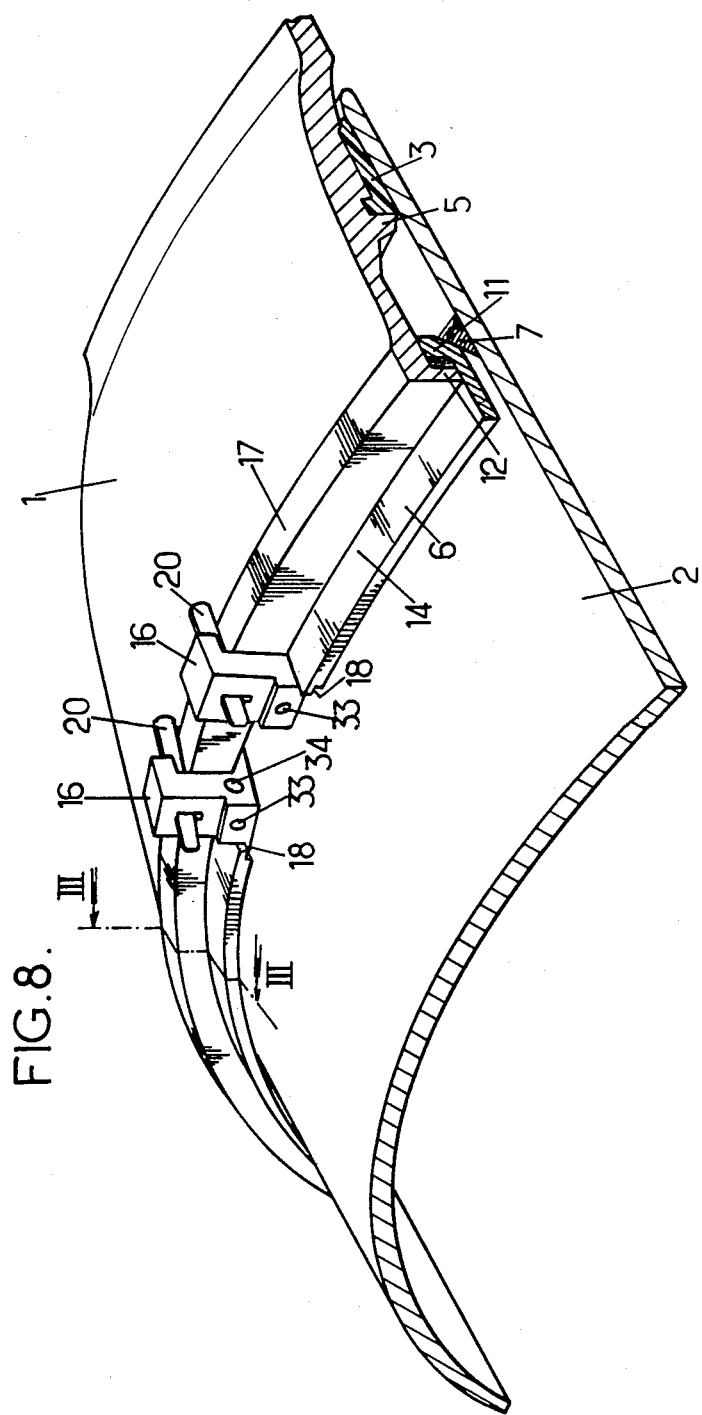
FIG. 8 is a partial perspective view of a joining device according to the invention, after its installation.

In the drawings reference numeral 1 designates a female end fitting or bell housing of a first pipe, and 2 designates a male spigot end of a second pipe which a joining device according to the invention is to connect in a sealed manner but with a certain degree of axial tilt freedom.

For this purpose a packing 3 with anchoring lug 4 is compressed radially between the spigot end 2 and the fitting 1; it is axially supported against a radial rib 5 of the latter.

The axial support of the fitting 1 on the spigot end 2 is ensured by the cooperation of a bearing ring 6 connected to the fitting and a radial shoulder 7 fastened to the spigot end by an annular weld 8. The ring and shoulder press against each other on their respective truncated surfaces 9 and 10. In order to allow the flange 11 of the ring 6 to pass behind a radial flange 12 of the fitting 1, the ring 6 is split as best seen clearly in FIG. 8, and is made of an elastic material, for example, steel or ductile cast iron. Thus, the ring 6 can distort enough so that its diameter decreases to a size allowing the flange 11 to pass inside the flange 12; the release of the ring allows it to expand enough to allow the entire periphery of the flange 11 to press against the internal surface of the fitting (see FIG. 1). It is to be noted that at the same time the flange 12 presses against the external peripheral surface 14 of the bearing ring 6 (FIG. 3) to define an annular space 15 between the flanges 11, 12 and surfaces 13, 14.

The joining device thus constituted, the known parts of which were just described, also has a locking or distancing device for holding the bearing ring 6 in its fully open or expanded position and to firmly apply its flange 11 against the internal surface 13 of the fitting 1 under all circumstances.

This locking device for maintaining the maximum expansion of the bearing ring 6 essentially comprises two clamps 16, fastened to the external peripheral edge 17 of the fitting 1, and which serve as stops for the split ends of the bearing ring 6. Such ends are formed with notches 18, which fit on the clamp stops or lugs 19 having complementary shapes see (FIGS. 4–7). These locking clamps 16 are spaced apart in a symmetrical manner with respect to the axial median plane which separates them, as can be seen clearly in FIG. 8.

Each clamp 16 is fastened to the edge 17 of the fitting using a wedging key 20 engaged in an opening 21 of the clamp, the shape of which can be clearly seen in FIG. 7, and this key is driven between the upper wall 22 of the opening 21 and the external peripheral surface of the edge 17, which essentially aligns flush with the lower wall 23 of the opening. To sufficiently anchor the key 20, each clamp 16 has, perpendicular to its central part or body 24, which itself is perpendicular to the axis 25 of the connection, an overhang 26 which defines a channel 27 to guide the key, with the inclined bottom of this channel constituting an extension of the upper wall 22 of the opening 21. The base 28 of the clamp ends with a radial edge 29 forming between itself and the body 24 a groove 30 to accommodate the flange 12 of the fitting 1.

As best seen in FIGS. 4 and 7, on the sides of the clamps intended to face each other the width of the groove 30 is such that it is completely blocked by the flange 12 of the fitting (FIG. 2), while on the opposite sides intended to engage the notches 18 of the bearing ring 6, the outlet width of the groove 30 is greater than the transverse section of the flange 12 (FIG. 1). As such a connection is established between a trough 31 (FIGS. 4 and 5) arranged at the bottom of each clamp, under the flange 12 when the clamp is in place, and the annular space 15 mentioned above. Consequently, it is very easy to fill this space 15 with balls of steel or another granular material 32 using a passage 33 passing through the lower part of the body 24 of the clamp and issuing at the bottom of the trough 31.

The joining device according to the invention can be installed in a very simple manner: by shrinking the split bearing ring 6 its diameter can be reduced sufficiently to allow its flange 11 to pass under and behind the flange 12 of the fitting 1. The ring 6 is then released and expands to its maximum size, and the external peripheral surface of the flange 11 comes into contact with the internal surface 13 of the fitting, the aforementioned annular space 15 is established between the two, and the truncated surface 9 is brought into contact with the truncated surface 10 of the radial shoulder 7. The two clamps 16 are then put into place by fitting their lugs 19 into the corresponding end notches 18 of the ring 6, and by passing their radial edge 29 behind the flange 12 of the fitting. It is to be noted that once the clamps are in position, they cannot come into contact with the radial shoulder 7, which has a recess or clearance 7a on the corresponding part of its length for this purpose (see FIGS. 1, 1a and 2).

When the clamps 16 have been put into place a hydraulic jack is introduced between them, and the shafts of the jack press against the bottoms of pockets 34 on the opposing surfaces of the clamps. The two clamps 16 are then moved a maximum distance apart, which applies the external peripheral surface of the flange 11 of the ring 6 with considerable pressure against the internal surface 13 of the fitting 1. Using the keys 20, the two clamps 16 are then locked against the external peripheral edge 17 of the fitting, whereafter the hydraulic jack is released and removed. Finally, the annular space 15 is filled with balls or similar materials, using the passages 33 of the clamps. When this space is full, these passages 33 need not be blocked because the balls remain in place due to gravity, and the clamps are of course positioned at the highest point of the connection.

Operations to disassemble, repair or inspect the device are also very simple, since it suffices to pop out the keys 20 to extract the clamps 16, then to shrink the ring 6 to compress it and pass it back under the flange 12, thus removing it, with the balls escaping freely from the space 15.

What is claimed is:

1. An apparatus for coupling two pipes together wherein a male spigot end (2) of one pipe is inserted into a female bell housing (1) on an end of another pipe, the bell housing defining an inner surface (13) and having a radially inwardly extending flange (12), comprising:
   (a) a circumferential, radially outwardly extending shoulder (7) fixed to the spigot end of said one pipe and disposed inwardly of the bell housing flange,
   (b) a split bearing ring (6) disposed around the spigot end, below the bell housing flange, and having a radially outwardly extending lip (11) hooked under and inside of said flange and defining therewith an annular chamber (15), said bearing ring having an internal surface (9) disposed in engagement with the spigot end shoulder,
   (c) a mass of incompressible granular material (32) disposed in said chamber,
   (d) a pair of spaced separation clamps (16) engaged with an end portion of the bell housing and each having a stop lug (19) disposed in mating engagement with a complementary configured end (18) of the ring, said clamps being forcibly spread apart to attendantly diametrically expand the split ring to urge the lip thereof into tight engagement with said inner surface (13) of the bell housing, and
   (e) means (20) for individually locking the spread apart clamps to said end portion of the bell housing to maintain said ring expansion.

2. An apparatus according to claim 1, wherein each clamp defines an opening (21) having an upper wall (22), the bell housing defines an external peripheral surface (17), and said locking means comprises, for each clamp, a jam key inserted in said opening (21) of the clamp and wedged between said upper wall (22) of said opening and said external peripheral surface (17) of the bell housing.

3. An apparatus according to claim 2, wherein to prevent the bell housing from moving axially during the wedging of the keys, each clamp comprises a body (24) extending perpendicularly to a base (28) disposed at the level of the bearing ring, said base having an inwardly extending edge, with the opening (21) for the key passing through said body, and a groove (30) defined between said body and said inwardly extending edge (29) of said base to accomodate the flange (12) of the bell housing, each clamp thus being hooked under and inside of said flange in the same manner as the split ring.

4. An apparatus according to claim 3, wherein each clamp further comprises an overhang (26) parallel to said base, said overhang defining a channel (27) having an inclined bottom to guide said key, and said inclined bottom of said channel constituting an extension of said upper wall (22) of the opening.

5. An apparatus according to claim 3 wherein, on sides of the clamps facing each other, the width of said groove (30) is such that it is totally blocked by the bell housing flange (12), while on opposite sides of the clamps the width of the groove is greater than a transverse section of said flange such that a trough (31) in the bottom of each clamp communicates with the annular chamber for said incompressible material, and a passage (33) extending through the body (24) of each clamp into said trough for supplying said material.

* * * * *